United States Patent [19]

Miller, Jr.

[11] 4,325,415
[45] Apr. 20, 1982

[54] BATTERY CLEANING APPARATUS

[75] Inventor: Gordon G. Miller, Jr., Richmond, Va.

[73] Assignee: Gordon G. Miller & Associates, Inc., Richmond, Va.

[21] Appl. No.: 140,429

[22] Filed: Apr. 15, 1980

[51] Int. Cl.³ .......................... B08B 3/02; B65B 3/02; B67C 1/00
[52] U.S. Cl. ........................................ 141/1; 134/152; 141/89; 141/231
[58] Field of Search .............. 134/94, 152, 181, 22 R; 137/237; 141/1, 85, 89–92, 231

[56] References Cited
U.S. PATENT DOCUMENTS
3,534,749  10/1970  Till ....................................... 134/152
3,786,842  1/1974  Rinnert ................................. 141/1

Primary Examiner—Frederick R. Schmidt
Attorney, Agent, or Firm—Harvey B. Jacobson

[57] ABSTRACT

An electrolytic battery which has become inoperative due to corrosion shorting the plates of the battery is inverted to remove all of the battery acid. The battery is then disposed over an apparatus comprising a plurality of jets which dispense a cleaning solution into the individual battery cells for a predetermined period of time. After the cleaning solution has been forced into the cells, the battery is drained and drying air is automatically forced into the cells to dry them. The battery is then returned to its upright position and the cells are filled with fresh acid.

13 Claims, 5 Drawing Figures

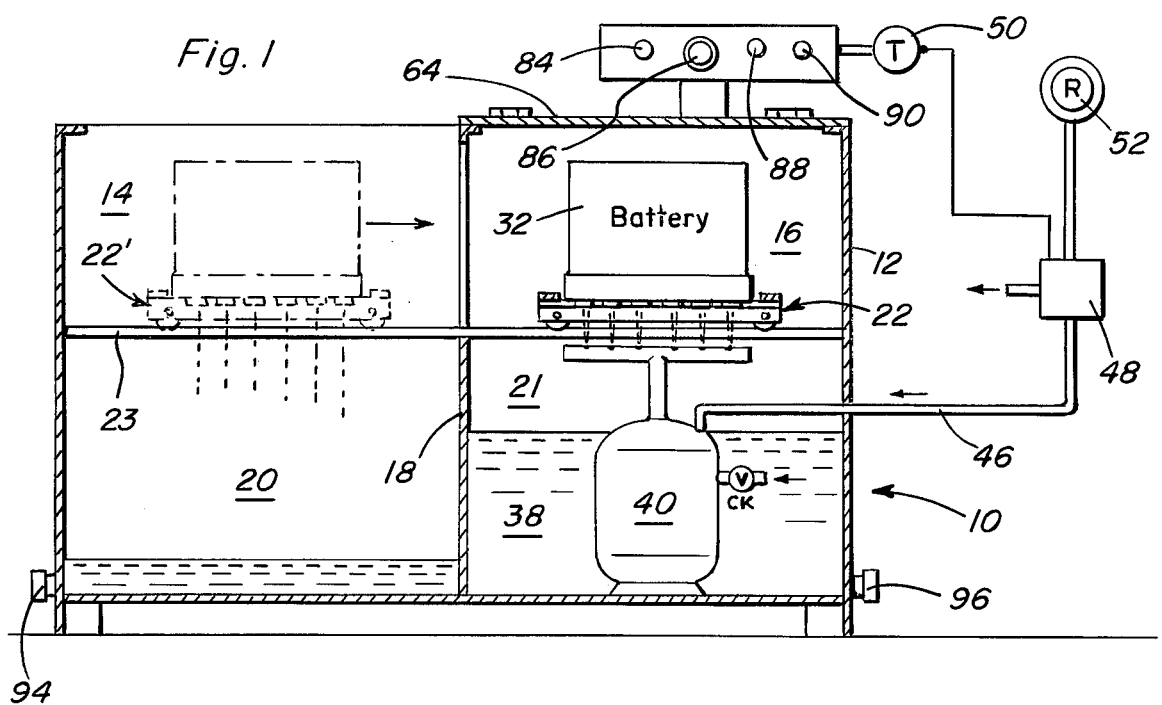
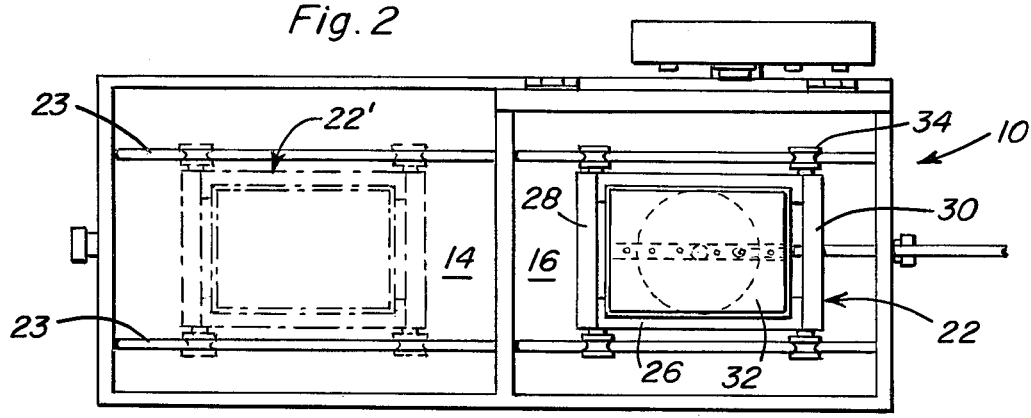
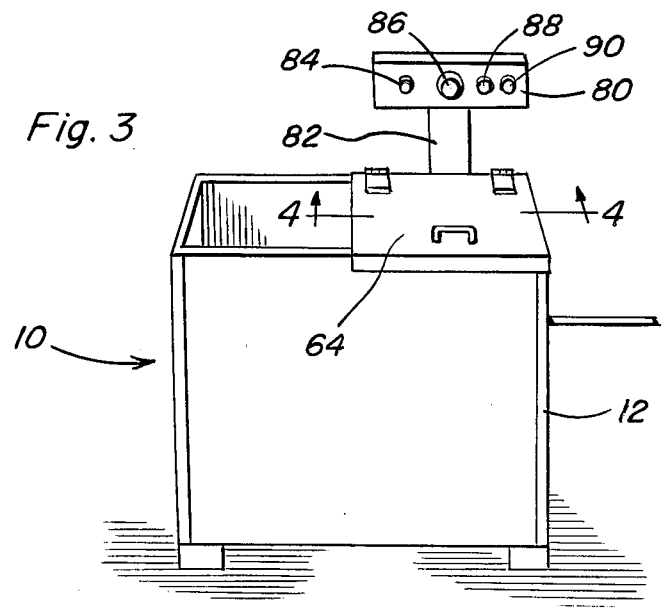

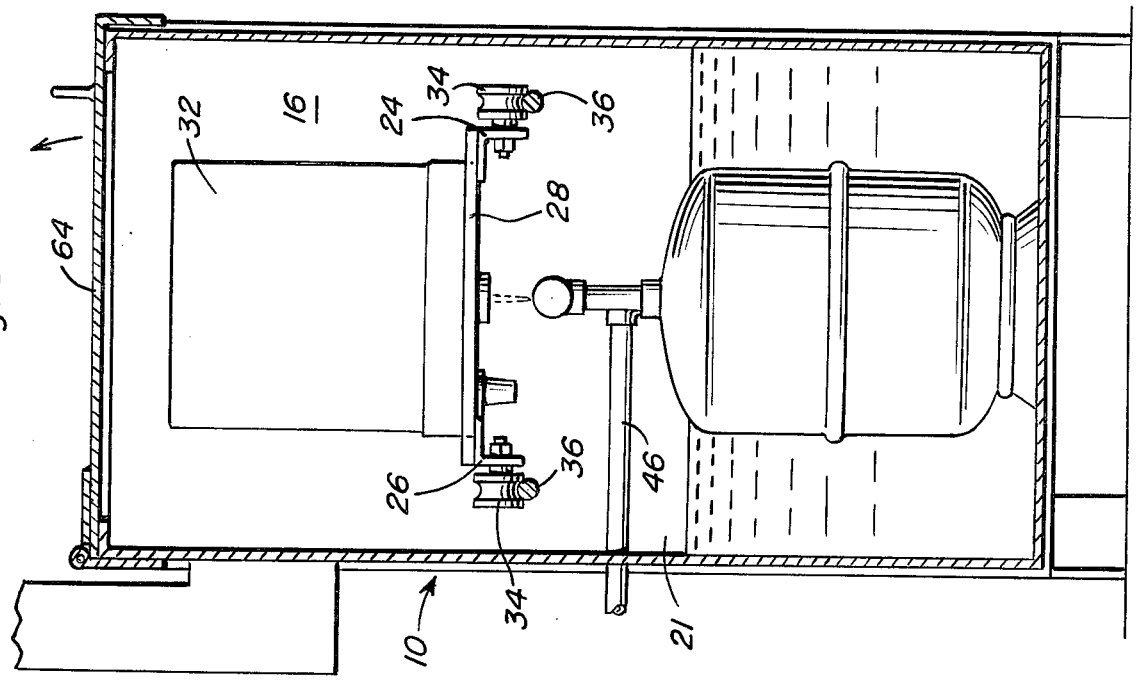
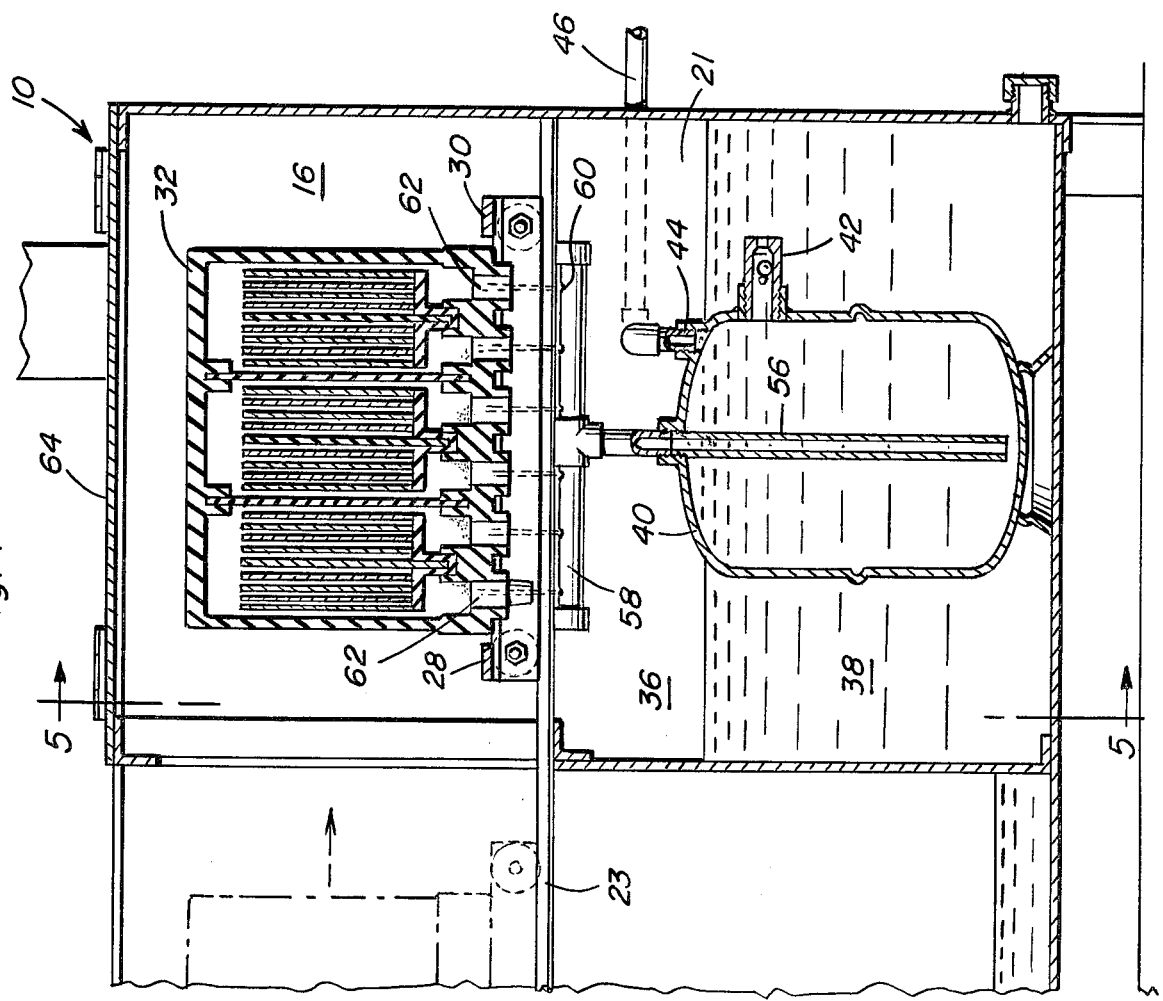

BATTERY CLEANING APPARATUS

BACKGROUND OF THE INVENTION

1. Field of the Invention

This invention relates to an apparatus for removing the sediment and corrosion in battery cells for the purpose of allowing the battery to be recharged to its full potential.

2. Discussion of Related Art

A major cause of failure of electrolytic cells such as used in automobile batteries is the accumulation of corrosion and sediment in the form of lead sulfate which coats the positive battery plates thus reducing the potential of the battery. Under normal operating procedures, the corrosion and sediment results in the battery failing to take and hold a charge and the battery is thereafter declared worthless and discarded. Due to the high cost of new batteries, it would be desirable to have some device which easily and effectively removes the corrosion and sediment so that the battery could be recharged and reused.

At this time, no devices are known which can be used to clean the interior of the cells of a battery in order that the useful life of the battery can be extended. Accordingly, a need for such a device has arisen.

SUMMARY OF THE INVENTION

One object of the present invention is to provide a device which is capable of removing corrosion from the interior of battery cells so that the battery can be recharged and reused.

A further object of the present invention is to provide a device which can remove the cell corrosion by application of a detergent to the cell interior and in one automatic operation dry the cell interior after the corrosion is removed so that the battery can be immediately refilled with acid.

An even still further object of the present invention is to provide a device which has a first stage in which the old battery acid is removed from the battery, and a second stage in which the emptied cells are cleaned of corrosion and sediment.

In accordance with the above objects, the apparatus of the present invention includes a housing having a first area into which the battery is placed in an inverted position with the caps of the individual cells removed. The battery is placed on a movable cart and allowed to remain until all the old battery acid has drained. The cart is then moved laterally to a second position wherein the cells of the battery are positioned over a plurality of jets which dispense cleaning solution. The jets are attached to a pressure tank which is itself immersed in cleaning solution. A check valve allows the cleaning solution to enter the pressure tank until pressure is applied to the tank. Pressure is automatically applied by a timer which forces the cleaning solution through the jets into the battery interior. Once all of the cleaning solution in the tank has been dispensed, the timer continues to allow pressure to be supplied to the tank which forces air directly through the jets into the battery interior causing the battery to be dried. After the automatic cycle is completed, the battery can be removed from the housing, and refilled with fresh battery acid.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational sectional view showing the structure of the battery cleaning apparatus.

FIG. 2 is a top plan view of the battery cleaning apparatus.

FIG. 3 is a perspective view of the battery cleaning apparatus.

FIG. 4 is an elevational sectional view taken substantially along a plane passing through section line 4—4 of FIG. 3 showing a battery being cleaned.

FIG. 5 is an end elevational sectional view taken substantially along a plane passing through section line 5—5 of FIG. 4.

DESCRIPTION OF THE PREFERRED EMBODIMENT

With reference to the drawings, a battery cleaning apparatus incorporating the principles and concepts of the present invention and generally referred to by the reference numeral 10 will be described in detail. The apparatus includes a housing 12 which covers drainage area 14 and cleaning area 16. Areas 14 and 16 are formed within the housing by use of a divider 18 which extends approximately half way up the housing. Thus, a waste tank 20 is formed in the drainage area and a wash tank 21 is formed in the cleaning area. A caustic neutralizer is contained in waste tank 20 to neutralize the battery acid ($H_2SO_4$).

A trolley 22 rides on cylindrical tracks 23 which extend between the drainage area 14 and wash area 16. The battery, after its cell caps are removed, is inverted and placed on the trolley 22 when the trolley is in position 22' depicted in FIGS. 1 and 2. Trolley 22 includes a pair of longitudinally extending angle members 24 and 26 which are interconnected at their ends by bars 28 and 30. Angle members 24, 26 each have one horizontally disposed side which sides are mounted coplanar to support battery 32. The other side of each angle member 24, 26 mounts wheels 34 which ride on tracks 23. The wheels 34 have incurved surfaces to receive the tracks thus stabilizing the trolley on the tracks.

After the acid is drained from battery 32, the battery is moved on trolley 22 into the cleaning area 16 over wash tank 21. Wash tank 21 contains a cleaning solution comprising a non-alkaline detergent with a foaming agent shown generally at 38. Cleaning solution 38 should have a pH of about 0.13 in order to properly clean the cells of battery 32. A pressure tank 40 is attached to the bottom of wash tank 21 and immersed in the cleaning solution 38. A ball check valve 42 provides an inlet for the tank through which cleaning solution 38 can flow. Accordingly, the level of solution within tank 40 equalizes with the level of the solution in the tank 21. Tank 40 has an air inlet 44 connected through line 46 to solenoid valve 48 which is opened and closed by timer 50. When timer 50 opens valve 48, pressure from reservoir 52 enters tank 40 thus pressurizing the interior of the tank and causing check valve 42 to close. The cleaning solution in the tank is then forced under this pressure through outlet tube 56 into spray header 58 which contains a plurality of jets 60. Each of the jets 60 is aligned with one open filler hole 62 of battery 32. Accordingly, a quantity of the cleaning solution determined by the volume of tank 40 is forced through the jets 60 enters the individual cells of the battery removing the sediment that collects at the bottom of the battery case and the excess corrosion from the positive plates of the battery. The sediment normally comprises lead sulphate which the cleaning solution is designed to dissolve and remove. Under normal operating conditions, it is found desirable to have the pressure supply 52 regulated to a pressure of 35–50 PSI. This is sufficient air pressure to cause proper flow of the cleaning solution through the jet 60 and remove the sediment and corrosion of the plates. Timer 50 should be set for a total of approximately 60–70 seconds for the entire operation to be completed. Of this time, it takes approximately 45 seconds to empty the contents of tank 40 into the battery causing the sediment and corrosion to be thoroughly cleaned from the battery. The last portion of the 60-second time interval is used to dry the interior of the battery cells. It will be noted that since pressure is still applied to tank 40, the check valve 42 remains closed even after all of the cleaning solution has been emptied therefrom. Accordingly, after the cleaning solution is forced through header 58 and jets 60, only pressurized air will be emitted from the jets. This pressurized air is forced into the cells and forces all of the cleaning solution out of the cell thus completely drying the cells and preparing them to receive fresh battery acid. After the battery is thoroughly cleaned and dried, door 64 which covers the cleaning area 16 can be lifted up and the battery removed. Trolley 22 is then repositioned in the drainage area of the housing to receive another battery to be cleaned. The cleaned battery is then returned to an upright position and filled with fresh acid and recharged. After the cleaning and drying cycle is completed, timer 50 automatically turns off solenoid valve 48 and the pressure within tank 40 is reduced such that check valve 42 once again allows the interior of tank 40 to fill with cleaning solution 38.

With respect to FIG. 3, it can be seen that the controls for operation of the system of the present invention are conveniently located in a control panel 80 which is mounted on arm 82 at a position above and behind the cleaning area 16. Accordingly, the control panel 80 is protected from being hit with any cleaning solution by virtue of door 64 which is always disposed in front of the control panel. The control panel contains an on-off pushbutton switch 84, a pressure gauge 86, cycle start switch 88 and cycle stop switch 90. Timer 50 is also contained in the control panel with the timing cycle being set at a predetermined timing interval.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for cleaning the interior of the cells of an electrolytic battery, comprising:
   a wash tank;
   a cleaning solution disposed in said wash tank;
   battery support means for supporting said battery in an inverted position over said wash tank; and
   cleaning fluid spray means for spraying said cleaning fluid and drying air into the individual cells of said battery including,
   a pressure tank immersed in said cleaning fluid, valve means for filling said pressure tank with the fluid in the wash tank, spray manifold means connected to said pressure tank for directing the fluid into the cells of the battery and pressure means for applying pressure to said tank forcing said fluid and drying air through said spray manifold means.

2. The invention as defined in claim 1 wherein said filling valve means includes a one-way check valve allowing cleaning solution to enter said pressure tank in the absence of pressure within said tank.

3. The invention as defined in claim 2 wherein said pressure means includes a regulated pressure supply, and pressure valve means for selectively applying pressure to said pressure tank, timer control means connected to said pressure valve means for allowing a timed application of pressure to said tank.

4. The invention as defined in claim 3 wherein said battery support means includes a cart mounted on tracks.

5. The invention as defined in claim 1 and further including a waste tank containing a neutralizer for neutralizing battery acid.

6. The invention as defined in claim 5 and further including tracks extending from said waste tank to said wash tank, and wherein said battery support means include a cart disposed on said tracks for moving a battery from said waste tank to said wash tank.

7. An apparatus for cleaning and the removal of corrosion in the individual cells of an electrolytic battery comprising: a wash tank containing a detergent, a pressure tank disposed in said detergent, means for filling said pressure tank with said detergent from the wash tank, pressure means for pressurizing said pressure tank with air, dispensing means for directing the pressurized detergent from said pressure tank to the cells of a battery to be cleaned, timer means connected to the pressure means for timing sequential discharge of the detergent and the air into said battery cells to wash and dry said battery.

8. The invention as defined in claim 7 wherein said dispensing means includes a spray manifold having a plurality of jets through which the pressurized detergent is sprayed into the cells of a battery.

9. The invention as defined in claim 8 wherein said means for filling said pressure tank includes a check valve means attached to said pressure tank for allowing fluid flow into said pressure tank in the absence of pressure in said pressure tank.

10. A method of cleaning and restoring the effectiveness of a corroded battery comprising the steps of:
    removing the old acid from said battery;
    forcing a cleaning fluid into said battery to remove sediment and corrosion; and
    drying the interior of said battery; the steps of cleaning and drying the interior of said battery including the steps of filling a tank with cleaning fluid and forcing said cleaning fluid from said tank under pressure until said tank is empty and thereafter allowing pressurized air to travel through said tank for drying said battery.

11. The invention as defined in claim 10 wherein the steps of cleaning and drying said battery interior include the steps of inverting the battery over a waste tank for removing the old battery acid and moving the battery laterally on a track to a position over a pressure tank from which said pressurized cleaning fluid is sprayed into the interior of said battery.

12. For use in a battery cleaning apparatus or the like having a liquid storing enclosure adapted to be filled to a predetermined level with a cleaning fluid, a cleaning chamber and a supporting structure mounted within the enclosure spaced above said predetermined level; a pressure tank mounted within the enclosure immersed in the fluid, a source of air under pressure, controllable valve means operatively connecting the source to the pressure tank for pressurization and depressurization thereof, fill valve means connected to the pressure tank within said enclosure below said predetermined level for filling the pressure tank with the fluid in response to said depressurization of the pressure tank, spray means connected to the pressure tank for upward discharge of the fluid therefrom into the cleaning chamber in response to said pressurization of the pressure tank, and control means connected to the controllable valve means for maintaining the pressure tank pressurized for an operational period during which the fluid and the air is sequentially discharged from the spray means into the cleaning chamber.

13. The combination of claim 12 wherein said supporting structure includes a track assembly extending externally of the cleaning chamber, and carriage means movably mounted on the track assembly for displacement of a battery in an inverted position from a location externally of the cleaning chamber to a location within the chamber in operative alignment with said spray means, whereby the spray means sequentially discharges the cleaning fluid and the air into individual cells of the battery during the operational period for washing and drying thereof.

* * * * *